(12) United States Patent
Thubert et al.

(10) Patent No.: US 8,843,657 B2
(45) Date of Patent: Sep. 23, 2014

(54) USING MULTIPLE TUNNELS BY IN-SITE NODES FOR SECURELY ACCESSING A WIDE AREA NETWORK FROM WITHIN A MULTIHOMED SITE

(75) Inventors: Pascal Thubert, La Colle sur Loup (FR); Eric M. Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 1440 days.

(21) Appl. No.: 11/407,922

(22) Filed: Apr. 21, 2006

(65) Prior Publication Data

US 2007/0250642 A1   Oct. 25, 2007

(51) Int. Cl.
| | |
|---|---|
| G06F 15/16 | (2006.01) |
| G06F 15/173 | (2006.01) |
| H04L 29/12 | (2006.01) |
| H04L 29/08 | (2006.01) |
| H04W 60/00 | (2009.01) |
| H04L 29/06 | (2006.01) |
| H04W 8/26 | (2009.01) |
| H04W 80/04 | (2009.01) |

(52) U.S. Cl.
CPC ............ *H04L 29/12915* (2013.01); *H04W 8/26* (2013.01); *H04L 67/30* (2013.01); *H04W 80/04* (2013.01); *H04L 61/6059* (2013.01); *H04W 60/005* (2013.01); *H04L 63/0272* (2013.01)
USPC .......................................... 709/245; 709/238

(58) Field of Classification Search
CPC . H04L 61/00; H04L 61/6059; H04L 61/2592; H04W 8/26; H04W 80/04
USPC ................................................ 709/249, 245
See application file for complete search history.

(56) References Cited

U.S. PATENT DOCUMENTS

| | | | | |
|---|---|---|---|---|
| 6,973,057 | B1 * | 12/2005 | Forslow | 370/328 |
| 2004/0078600 | A1 * | 4/2004 | Nilsen et al. | 713/201 |
| 2005/0047348 | A1 * | 3/2005 | Suzuki et al. | 370/252 |
| 2005/0111380 | A1 * | 5/2005 | Adrangi et al. | 370/254 |
| 2005/0177647 | A1 * | 8/2005 | Anantha et al. | 709/249 |
| 2006/0018301 | A1 * | 1/2006 | Schrufer | 370/351 |
| 2006/0092949 | A1 | 5/2006 | Thubert | |
| 2006/0268901 | A1 * | 11/2006 | Choyi et al. | 370/401 |
| 2007/0258473 | A1 * | 11/2007 | Ruffino et al. | 370/401 |

OTHER PUBLICATIONS

U.S. Appl. No. 11/198,190, filed Aug. 5, 2005, Ribiere et al.

(Continued)

*Primary Examiner* — Emmanuel L Moise
*Assistant Examiner* — Xiang Yu
(74) *Attorney, Agent, or Firm* — Leon R. Turkevich

(57) ABSTRACT

A multihomed site includes in-site network nodes, and first and second gateways configured for providing access outside of the multihomed site. The network nodes and the gateways are configured for utilizing in-site addresses having an in-site address prefix that is not advertised outside of the prescribed site. Each gateway is configured for outputting an advertisement message into the multihomed site that specifies that the gateway is a home agent for a corresponding extra-site address prefix reachable inside and outside the multihomed site. Each in-site network node includes a mobile IP module configured for acquiring extra-site addresses from each of the advertised extra-site address prefixes, and creating mobile IP tunnels with the first and second gateways, enabling the corresponding extra-site address to be reachable via the in-site address. Each node also includes a selection resource for outputting a packet on a selected mobile IP tunnel, based on preference information.

37 Claims, 5 Drawing Sheets

(56) References Cited

OTHER PUBLICATIONS

Rekhter et al., "Address Allocation for Private Internets", IETF Network Working Group, Request for Comments: 1918, Feb. 1996, pp. 1-9.
Deering et al., "Internet Protocol, Version 6 (IPv6) Specification", IETF Network Working Group, Request for Comments: 2460, Dec. 1998, pp. 1-39.
Hain, "Architectural Implications of NAT", IETF Network Working Group, Request for Comments: 2993, Nov. 2000, pp. 1-29.
Abley et al., "Goals for IPv6 Site-Multihoming Architectures", IETF Network Working Group, Request for Comments: 3582, Aug. 2003, pp. 1-9.
Johnson et al., "Mobility Support in IPv6", IETF Network Working Group, Request for Comments: 3775, Jun. 2004, pp. 1-165.
Devarapalli et al., "Network Mobility (NEMO) Basic Support Protocol", IETF Network Working Group, Request for Comments: 3963, Jan. 2005, pp. 1-33.
Hinden et al., "Unique Local IPv6 Unicast Addresses", IETF Network Working Group, Request for Comments: 4193, Oct. 2005, pp. 1-16.
Rosen et al., "BGP/MPLS IP Virtual Private Networks (VPNs)", IETF Network Working Group, Request for Comments: 4364, Feb. 2006, pp. 1-47.
Huitema et al., "Ingress filtering compatibility for IPv6 multihomed sites", IETF Network Working Group, Internet Draft <draft-huitema-multi6-ingress-filtering-00> Oct. 16, 2004, pp. 1-16.
Montavont et al., "Analysis of Multihoming in Mobile IPv6", IETF MONAMI6 Working Group, Internet Draft <draft-ietf-monami6-mipv6-analysis-00.txt> Feb. 20, 2006, pp. 1-33.
Ernst et al., "Motivations and Scenarios for Using Multiple Interfaces and Global Addresses", IETF MONAMI6 Working Group, Internet Draft <draft-ietf-monami6-multihoming-motivation-scenario-00> Feb. 2006, pp. 1-24.
Ng et al., "Analysis of Multihoming in Network Mobility Support", IETF NEMO Working Group, Internet Draft <draft-ietf-nemo-multihoming-issues-05> Feb. 23, 2006, pp. 1-46.
Van De Velde et al., "IPv6 Network Architecture Protection", IETF Network Working Group, Internet Draft <draft-ietf-v6ops-nap-02.txt> Oct. 22, 2005, pp. 1-36.
Kuntz et al., "Evaluating Multiple Mobile Routers and Multiple NEMO-Prefixes in NEMO Basic Support", IETF NEMO Working Group, Internet Draft <draft-kuntz-nemo-multihoming-test-02.txt> Jul. 18, 2005, pp. 1-26.
Montavont et al., "Mobile IPv6 for multiple interfaces (MMI)", IETF MIP6 Working Group, Internet Draft <draft-montavont-mip6-mmi-02.txt> Jul. 15, 2005, pp. 1-23.
Montavont et al., "Home Agent Filtering for Mobile IPv6", IETF Network and Protocol Team, Internet Draft <draft-montavont-mobileip-ha-filtering-v6-00.txt> Jul. 23, 2003, pp. 1-19.
Ng et al., "Host/Edge Multihoming Problem Statement", IETF ("No Specific Working Group"), Internet Draft <draft-ng-edge-multihoming-problem-statement-00> Jul. 2004, pp. 1-17.
Fikouras et al., "Mobile IPv4 Flow Mobility Problem Statement", IETF MIP4 Working Group, Internet Draft <draft-nomad-mip4-flow-mobility-pb-00.txt> Feb. 2004, pp. 1-9.
Fikouras et al., "Filters for Mobile IPv4 Bindings (NOMADv4)", IETF MIP4 Working Group, Internet Draft <draft-nomad-mobileip-filters-05.txt> Oct. 2003, pp. 1-27.
Kuladinithi et al., "Filters for Mobile IPv6 Bindings (NOMADv6)", IETF MIP6 Working Group, Internet Draft <draft-nomadv6-mobileip-filters-03.txt> Oct. 2005, pp. 1-27.
Soliman et al., "Flow movement in Mobile IPv6", IETF Internet Draft <draft-soliman-mobileip-flow-move-03.txt> Jun. 2003, pp. 1-8.
Soliman et al., "Flow Bindings in Mobile IPv6", IETF MONAMI6 Working Group, Internet Draft <draft-soliman-monami6-flow-binding-00.txt> Feb. 27, 2006, pp. 1-30.
Wakikawa et al., "Multiple Care-of Addresses Registration", IETF MONAMI6 Working Group, Internet Draft <draft-wakikawa-mobileip-multiplecoa-05> Feb. 2006, pp. 1-35.
MONAMI Home Page, "Additional Page for *IETF MONAMI6 WG* (MObile Nodes And Multiple Interfaces in IPv6)", Mar. 8, 2006 (Retrieved on Apr. 5, 2006 from the World Wide Web at "nautilus6.org/ietf/monami6"), pp. 1-4.
Haley et al., "Mobility Header Signaling Message", IETF Mobile IPv6, Internet Draft <draft-haley-mip6-mh-signaling-01.txt> Oct. 2005, pp. 1-12.
Draves, "Default Address Selection for Internet Protocol version 6 (IPv6)", Network Working Group, Request for Comments: 3484, Feb. 2003, pp. 1-24.
Clausen et al., "Optimized Link State Routing Protocol (OLSR)", Network Working Group, Request for Comments: 3626, Oct. 2003, pp. 1-75.
Engelstad et al., "Internet Connectivity for Multi-Homed Proactive Ad Hoc Networks" [online], Jun. 2004 [retrieved on Nov. 16, 2010]. Retrieved from the Internet: <URL: http://olsr.org/docs/XA-OLSR-paper-for-ICC04.pdf>, pp. 1-7.

* cited by examiner

USING MULTIPLE TUNNELS BY IN-SITE NODES FOR SECURELY ACCESSING A WIDE AREA NETWORK FROM WITHIN A MULTIHOMED SITE

BACKGROUND OF THE INVENTION

1. Field of the Invention

The present invention relates to assignment of an Internet Protocol (IP) source address for a host device to access a destination via a prescribed multihomed site (e.g., a Virtual Private Network Enterprise) having multiple connections to a wide area network such as the Internet. More particularly, the present invention relates to maintaining secrecy of unique local IPv6 addresses (i.e., in-site addresses), used by in-site IPv6 nodes for communication within a prescribed multihomed site, while communicating with an extra-site destination via the wide area network.

2. Description of the Related Art

A multihomed (or multi-homed) site is a site (e.g., a private local area network or private wide area network) having multiple connections to a wide area network such as the Internet. The term "site" as used herein follows the definition specified in Internet Engineering Task Force (IETF) Request for Comments (RFC) 3582: an entity autonomously operating a network according to Internet Protocol and, in particular, determining the addressing plan and routing policy for that network. This definition of "site" as used herein is equivalent to the term "enterprise" as defined in RFC 1918.

An exemplary multi-homed site is illustrated in commonly-assigned, application Ser. No. 11/198,190, filed Aug. 8, 2005, the disclosure of which is incorporated in its entirety herein by reference.

As described in the above-incorporated application Ser. No. 11/198,190, the multiple connections by the site may be provided by a single Internet Service Provider (ISP) providing multiple links to the public wide area network, or by different ISPs providing respective links to the public wide area network. In addition, the multiple links may be located at separate geographic locations. Advantages to a multi-homed site include improved fault tolerance, load-balancing, etc.

Multi-homing solutions today apply to both IPv4 and IPv6 networks: a site obtains a dedicated block of address space (i.e., a prescribed address prefix) from each ISP, and assuming multiple ISPs are employed, the site advertises the routes for the respective address prefixes via the respective ISP connections. Hence, the site owns address prefixes from each of the ISPs, creating the possibility that a host node in the site sources a packet (i.e., generates a packet) having a source address within the address space of the first ISP (e.g., ISP-A), and causes the packet to be routed via the second ISP (e.g., ISP-B). A disadvantage of advertising multiple prefixes, however, is that it multiplies the number of routes that need to be distributed throughout the "Default Free Zone" (DFZ) between the site and the public wide area network.

The IETF has established a Working Group, entitled the "Site Multihoming in IPv6 (multi6)" Working Group, that addresses technical issues associated with implementing a multi-homed site. As described on the "Multi6" working group web site, publicly available at the web site address "ietf.org/html.charters/multi6-charter.html", multihoming today is performed largely by a site obtaining a dedicated block of address space and then advertising a route for its prefix through each of its ISP connections. The address block may be from the so-called provider independent space, or may be a sub-allocation from one of its ISPs. A site's ISPs in turn advertise the prefix to some or all of their upstream connections and the route for the prefix may propagate to all of the routers connected to the default-free zone (DFZ). As the number of sites multihoming in this manner increase, the number of routes propagated throughout the DFZ increases and overall routing stability decreases because of the burden on convergence time.

The Multi6 Working Group has stated on its web page that it will seek alternative approaches with better scaling properties. Additional details regarding the goals for IPv6 site multihoming architectures is described in its RFC 3582. However, the Multi6 Working Group is focusing on host-based solutions, which had the disadvantage of not utilizing network-based management systems that may be able to provide optimized routes based on network conditions and routing protocols.

Another problem that needs to be addressed in the context of multi-homed sites involves the interaction between legacy host devices and ingress filtering by access routers providing a connection between the site and the public wide area network. In particular, a site having two access routers from respective ISPs and that follow source address ingress filtering rules may encounter packets being dropped if the packets do not comply with the source address ingress filtering rules. In other words, an access router may determine from its ingress filtering rules that a packet is not topologically correct because it does not specify a source address that is within the prescribed source address prefix (i.e., address realm) assigned to the access router. For example, the Internet Draft by Huitema et al., "Ingress filtering compatibility for IPv6 multihomed sites" (draft-huitema-multi6-ingress-filtering-00) describes that ingress filtering, normally used to verify the source address of the IP packets in order to prevent denial of service attacks based on using "spoofed" source addresses, actually may cause an access router to drop legitimate packets due to a host device utilizing an IP source address that is within an assigned address prefix of another access router and that is outside the address prefix range of the access router receiving the IP packet. Huitema et al. proposes minimizing ingress filtering conflicts by creating source address dependent (SAD) routing, where routers in the source based routing domain maintained as many parallel routing tables as there are valid source prefixes, causing the packets to exit the site to the appropriate router. Huitema et al. also proposes adding an exit router discovery mechanism within host devices to enable the host device to discover the preferred exit router for a given source address; hence, the host device can tunnel the packet directly to the adequate exit router.

Unfortunately, the source address selection in Huitema et al. is still performed randomly by the host device, and does not address that a given source address may be preferred in certain instances. Moreover, the above-identified Internet Draft by Huitema et al. does not address exploiting the advantage of redundancy in a multi-homing site. Further, the SAD routing proposed by Huitema et al. requires multiple instances of the routing protocol to be executed for respective prefixes; hence, each instance of the routing protocol only will possess knowledge learned through the corresponding ISP associated with the address prefix: if one of the ISPs encounters a failure, the default route will not be advertised by the corresponding exit router, causing routers within the site to remove the default route entry from their default routing tables; however, the multi-homed host device will be unaware of the unavailability of the failed ISP. Hence, a problem arises that a multi-homed host device may continue to send packets using a source address derived from an address prefix that has been assigned by the failed ISP.

Another issue of site multihoming involves deploying a protocol for mobile host devices that are attached to the multihomed site. In particular, IP-level mobility support protocols such as Mobile IPv6 (RFC 3775) and NEMO Basic Support (RFC 3963) do not provide standardized support for simultaneous differentiated use of multiple access technologies. The IETF has formed the Mobile Nodes and Multiple Interfaces in IPv6 (monami6) Working Group. As described on the "Monami6" working group website, publicly available at the website address "ietf.org/html.charters/monami6-charter.html", the goal of the Monami6 working group is to address problems associated with the simultaneous use of multiple addresses for either mobile hosts using Mobile IPv6 or mobile routers using NEMO Basic Support and their variants (FMIPv6, HMIPv6, etc).

Still another concern is safeguarding computers having access to a wide area network (such as the Internet) while preserving network-based services for those computers. Of particular interest is the effort to maintaining the secrecy of an IP address used by a network node.

In particular, efforts are underway to expand the realm of private networks for enterprise applications, where a large private site can be formed based on private (e.g., secure) connections and routes are established between remote nodes. An example of a larger private site is a Virtual Private Network as described in RFC 4364 by Rosen et al., "BGP/MPLS IP Virtual Private Networks (VPNs)", published February 2006. Rosen et al. describes a method by which an IPv4 Service Provider may use an IP backbone to provide IPv4 VPNs (Virtual Private Networks) for its customers. However, Rosen et al. also suggests in Section 11 ("Accessing the Internet from a VPN") that private routes would need to be leaked to the global Internet. Consequently, discovery of a private route would enable an untrusted source to analyze an IP address to discover an internal topology of a VPN.

Unfortunately, all nodes within a private network would need to use global source addresses in order to perform any communications with a remote node via a wide area packet switched network such as the Internet. Hence, VPNs cannot be used to hide global source addresses of VPN users.

One approach for hiding global IPv4 source addresses for VPN users has been to deploy Network Address Translators. Network Address Translators (NATs) were originally developed to delay address depletion by reuse of private IPv4 addresses by network nodes in IPv4-based private networks. The NATs, serving as an interface between a private network and the wide area network such as the Internet, would translate between the prescribed IPv4 addresses and a public IPv4 address used by the NAT as a point of attachment to the Internet. In particular, NATs perform a Layer-3 translation of IP addresses, so that public Internet addresses map to private IP addresses, as described in detail by the Request for Comments 1918 (RFC 1918), published by the Internet Engineering Task Force (IETF), available on the World Wide Web at www.ietf.org. This mapping has allowed enterprises to map a large number of private addresses to a limited number of public addresses, thus limiting the number of public addresses required by Internet users.

In addition, the use of NATs in a private IPv4 network enables the private IPv4 address used by a network node to be "hidden" from the Internet, especially since the private IPv4 addresses are reserved by the Internet Assigned Numbers Authority (IANA) exclusively for private networks. Exemplary IPv4 network prefixes reserved by the IANA for private networks include the 10/8 prefix (a single Class A network number), 172.16/12 prefixes (a set of 1 contiguous Class B network numbers), and 192.168/16 prefix addresses (a set of 256 contiguous Class C network numbers).

Hence, NATs enable VPN users to hide their IPv4 source addresses, and therefore the VPN topology from external entities.

Unfortunately, NATs suffer from numerous problems, as described in details in numerous publications by the IETF, including RFC 2993. Consequently, there is doubt that NATs will be developed for Internet Protocol Version 6 (IPv6) as defined in RFC 2460.

Consequently, concerns arise for the need for security in deployment of IPv6 networks, and preventing IPv6 addresses from being distributed beyond a prescribed site. For example, RFC 4193 by Hinden et al., entitled "Unique Local IPv6 Unicast Addresses", published October 2005, describes an IPv6 unicast address format that is globally unique and intended for local IPv6 communications within-site boundaries, while allowing sites to be combined or privately interconnected.

Although Hinden et al. recognizes that unique local IPv6 unicast addresses could be "leaked" outside the site boundaries onto the Internet, Hinden et al. recommends that border router policies and firewall filtering policies be implemented to prevent the local IPv6 unicast addresses from being sent onto the Internet. Hence, a disadvantage recognized by Hinden et al. is that it is not possible to route local IPv6 prefixes on the global Internet with current routing technology.

The Internet Draft by Van de Velde et al., "IPv6 Network Architecture Protection" <draft-ietf-v6ops-nap-02.txt>, Oct. 22, 2005, describes another example of hiding a network topology for an IPv6 site, but does not address multi-homed sites or non-IPv6 sites.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
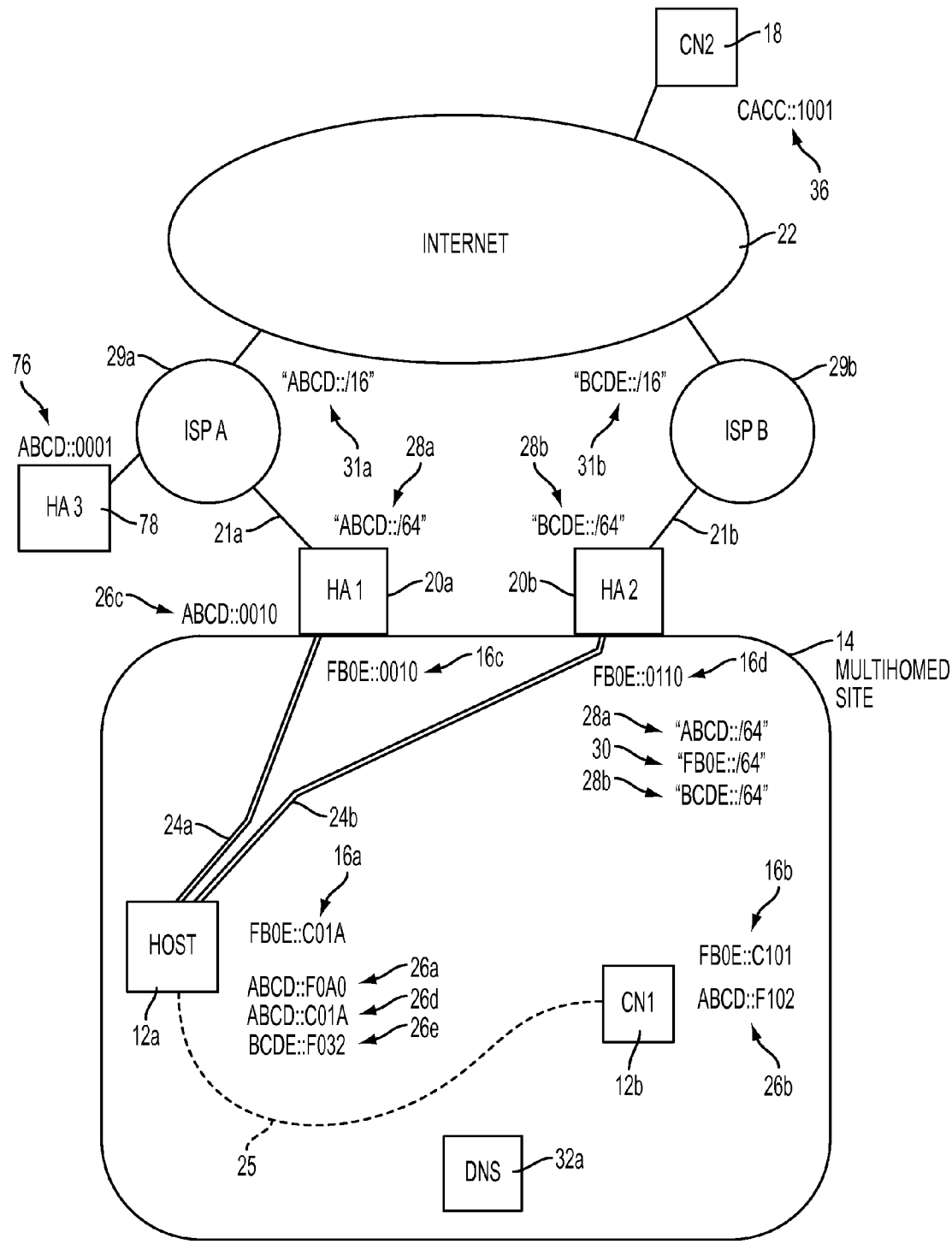
FIG. 1 is a diagram illustrating an internetworking system including a multihomed site including in-site network nodes and multiple gateways for providing connectivity to a wide area network, according to an embodiment of the present invention.

There is a need for an arrangement that enables host nodes to communicate securely within a prescribed multihomed site such as a Virtual Private Network (VPN) Enterprise, while maintaining secrecy if a host node needs to access a wide area network, without the necessity of a NAT.

There also is a need for an arrangement that enables host nodes in a multihomed site (e.g., a multihomed VPN) to gain access to a wide area network, while avoiding disclosure of addressing or topology information related to the VPN.

There also is a need for an arrangement that enables host nodes in a multihomed site, having first and second access routers providing connectivity to a wide area network such as the Internet, to automatically change source addresses from a first prefix assigned to the first access router to a second prefix assigned to the second access router, based on a prescribed detected condition within the multihomed site.

These and other needs are addressed herein, where a multihomed site includes in-site network nodes, and first and second gateways configured for providing access outside of the multihomed site. The in-site network nodes and the gateways are configured for utilizing in-site addresses having an in-site address prefix that is not advertised outside of the prescribed site, therefore unreachable outside of the prescribed site. Each gateway is configured for outputting an advertisement message into the multihomed site that specifies that the gateway is a home agent for a corresponding extra-site address prefix that is reachable inside and outside the multihomed site. Each in-site network node includes a resource for acquiring a corresponding in-site address, and a mobile IP module configured for acquiring extra-site addresses from each of the advertised extra-site address prefixes, and creating mobile IP tunnels with the first and second gateways enabling the corresponding extra-site address to be reachable via the in-site address. Each in-site network node also includes a selection resource for outputting a packet on a selected mobile IP tunnel, based on preference information identifying whether one of the tunnels is preferred.

Hence, each in-site network node can communicate outside the multihomed site using an extra-site address, while maintaining the secrecy of the in-site address based on the home agent within the corresponding gateway serving as a network presence for the corresponding extra-site address, and terminating the mobile IP tunnel within the multihomed site with the in-site network node. Moreover, each in-site network node can select from among the available tunnels for transmitting data outside the multihomed site, optimizing communications based on attributes such as load balancing, shortest path, link availability, etc., regardless of whether the preference information is determined independently by the in-site network node, or whether the preference information is communicated by the respective gateways.

Additional advantages and novel features will be set forth in part in the description which follows and in part will become apparent to those skilled in the art upon examination of the following or may be learned by practice thereof.

The disclosed embodiment is an enhancement of commonly-assigned, application Ser. No. 10/978,384, filed Nov. 2, 2004, entitled "Maintaining Secrecy of Assigned In-Site Addresses for IPv6 Nodes within a Prescribed Site During Access of a Wide Area Network", the disclosure of which is incorporated in its entirety herein by reference. In particular, the above-incorporated application Ser. No. 10/978,384 describes a single gateway as an egress point for a prescribed site: the single gateway maintains a binding cache entry for each in-site network node that requires extra-site communications, the binding cache entry specifying that an extra-site address used by the in-site network node is reachable via a specified in-site address. The single gateway maintains a secure tunnel for communications with the in-site network node using the extra-site address within the site.

The disclosed embodiment expands on the above-incorporated application Ser. No. 10/978,384 by configuring the in-site network nodes to create multiple mobile IP tunnels with respective gateways configured for operating as home agents according to mobile IP protocols, for example as described in RFC 3775 and RFC 3963. Moreover, each in-site network node includes a selection resource configured for selecting one of the established mobile IP tunnels for outputting a packet, based on preference information that identifies whether one of the mobile IP tunnels is preferred.

Hence, an in-site network node can establish multiple concurrent mobile IP tunnels with respective gateways, and output data via a selected mobile IP tunnel based on various preference attributes. Further, the gateways can be configured for supplying preference information to the in-site network nodes, enabling data traffic to be directed based on network management metrics, for example optimized paths, shortest cost distance, load-balancing, or redirecting traffic due to congestion or failure on an egress link detected by a gateway.

As described below, each gateway also can be configured as a mobile router, enabling a gateway having encountered a failure on an egress link to dynamically register with the alternate gateway in order to continue serving extra-site traffic destined for the gateway, while dynamically redirecting traffic from the in-site network nodes to the alternate gateway.

FIG. 1 is a diagram illustrating an internetworking system 10 configured for sending packets between a host network node ("Host") 12a within a prescribed multihomed site 14, and correspondent nodes ("CN1" and "CN2") 12b and 18, according to an embodiment of the present invention. The multihomed site 14 includes gateways 20a and 20b that provide connectivity for the multihomed site 14 to the wide area network (e.g., Internet) 22 via respective egress links 21a and 21b. In particular, each gateway 20a and 20b is assigned a corresponding unique extra-site address prefix "ABCD::/64" 28a and "BCDE::/64" 28b by a corresponding service provider 29a and 29b having a corresponding distinct address prefix "ABCD::/16" 31a and "BCDE::/16" 31b; alternately, the gateways 20a and 20b may be assigned the extra-site address prefixes 28a and 28b by a single service provider that owns both prefixes 31a and 31b.

The host network node ("Host") 12a and the in-site correspondent node ("CN 1") 12b are part of the same multihomed site 14, in that they share a trusted relationship (e.g., corporate security agreement, vendor agreement, etc.). The in-site network nodes 12a and 12b have respective assigned in-site IPv6 addresses "FB0E::C01A" 16a and "FB0E::C101" 16b for communication within the prescribed multihued site 14. Each gateway 20a and 20b also has a corresponding in-site IPv6 address "FB0E::0010" 16c and "FB0E::0110" 16d.

As described above, the term "site" follows the definition specified in RFC 3582, and is equivalent to the term "enterprise" as defined in RFC 1918. The term "in-site IPv6 address" is defined herein as an IPv6 address that is visible and reachable only within the site. Hence, the "in-site IPv6 address" is essentially the same as (and hence also is referred to herein as) a "unique local IPv6 address", as defined in RFC 4193. Since the disclosed embodiment also could be applied to IPv4 host nodes, however, the in-site IPv6 address could be substituted with an in-site IPv4 address, or in-site host address in general.

Hence, the nodes 12a and 12b can communicate using their respective in-site host addresses (e.g., in-site IPv6 addresses) 16a and 16b based on the mutual trusted relationship. The in-site host addresses could be obtained from a global range, as described in RFC 3513; alternately, the site addresses could be obtained from an organizational scope as described in the Internet Draft by Hain et al., entitled "Goals for Organizational-Scope Communications", <draft-hain-templin-ipv6-localcomm-04.txt>, Dec. 8, 2003.

The external correspondent node 18 that is reachable via the wide area network 22, however, has no such trusted relationship with any node 12 in the multihomed site 14, regardless of whether the correspondent node 18 is reached via the ISP 29a or the ISP 29b. Hence, there is a need for the network nodes 12 to be able to hide their unique local IPv6 addresses 16 from the external correspondent node 18. In particular, hiding the unique local IPv6 address (e.g., 16a) not only protects the identity of the corresponding host (e.g., 12a), but also hides the topology of the multihomed site 14.

According to the disclosed embodiment, each of the gateways 20a and 20b are configured to operate as Mobile IP home agents (HA) for transferring data between the host network node (e.g., 12a) and the external correspondent node 18 via the corresponding service provider 29a and 29b and the external network 22. In particular, each gateway 20a and 20b is configured for operating as a Mobile IP home agent in accordance with RFC 3775, RFC 3963, and the above-incorporated application Ser. No. 10/978,384, and the host network node 12a is configured for operating as a mobile node, enabling the host node 12a to establish a secure connection (e.g., a secure tunnel) 24a and/or 24b with the corresponding home agent 20a and/or 20b based on the unique local address 16a of the network node. The gateways 20a and 20b output respective router advertisement messages specifying that they are home agents for the respective advertised extra-site prefixes 28a and 28b.

In response to the host network node 12a determining that it needs to communicate with an extra-site node 18, the host network node 12a acquires an extra-site IPv6 address 26, for example the extra-site address 26a for communications via the home agent 20a, and/or the extra site address 26e for communications via the home agent 20b. As described below, the host network node 12a can learn about the home agents 20a and 20b using Dynamic Home Agent Address Discovery (DHAAD) as specified in RFC 3775: note that since the site 14 is secure, the use of DHAAD within the site 14 does not raise any security concerns.

The term "extra-site address" is defined herein as a network address that is globally visible and reachable inside a multihomed site, but that is not used to physically point to a host (e.g., 12a). Rather, each extra-site address (e.g., 26a, 26e) is a logical redirection (like a pointer) that is dynamically mapped, by the means of the disclosed embodiment, to a corresponding attachment address providing connectivity for the host. The second address is an in-site address (e.g., 16a) when the host node 12 is located within (i.e., attached within) the site, or a care-of address (e.g., 26d) when the host node is located outside of (i.e., attached outside of) the multihomed site 14 (i.e., in the wide area network 22). The extra-site address spaces 28a and 28b are virtually located at the corresponding site gateway (implemented as a home agent) 20a and/or 20b, more precisely at the home agents 20a and 20b which are within the respective address realms 31a and 31b of the respective service providers 29a and 29b.

Hence, the network node 12a obtains from the home agents 20a and 20b respective extra-site addresses 26a and 26e as public IPv6 addresses: the network node 12a obtains the extra-site address "ABCD::F0A0" 26a having an IPv6 address prefix "ABCD::/64" 28a advertised within the site 14 as reachable via the home agent 20a of the ISP 29a, and advertised in the wide area network by the ISP 29a as reachable via the ISP 29a (via the subnet prefix 31a); the network node 12a also obtains the extra-site address "BCDE::F032" 26e having an IPv6 address prefix "BCDE::/64" 28a advertised within the site 14 as reachable via the home agent 20b of the ISP 29b, and advertised in the wide area network 22 by the ISP 29b as reachable via the ISP 29b (via the subnet prefix 31b).

Note, however, that in-site IPv6 address prefix "FB0E::/64" 30 of the in-site IPv6 addresses 16a, 16b is advertised and is reachable only within the prescribed multihomed site 14, and not outside of the prescribed multihomed site 14; hence, the wide area network 22 is unable to route any packet having the in-site address prefix "FB0E::/64" 30 due to the absence of any routing information. Hence, the secrecy of the unique local addresses 16a, 16b within the prescribed multihomed site is maintained.

The hosts 12a and 12b and the gateways 20a and 20b are configured for providing reachability for the node 12a to access extra-site correspondent node "CN2" 18 using the extra-site address 26a or 26b based on deploying within the multihomed site 14 an extended version of "Mobile IPv6" protocol, described for example in RFC 3775 by Johnson et al., entitled "Mobility Support in IPv6", published June 2004. According to RFC 3775, the Mobile IPv6 protocol enables a mobile node to move from one link to another without changing the mobile node's IP address. In particular, the mobile node (e.g., 12a) is assigned a "home address" (e.g., 26a or 26b); although a "home address" is ordinarily considered to be assigned within its home subnet prefix on its home link, the disclosed embodiment enables a host 12a to utilize multiple "home addresses" (i.e., "extra-site addresses"), so long as the host 12a sends the packets to the wide area network 22 via the corresponding assigned tunnel (e.g., 24a, 24b) to ensure that packet transmission is topologically correct in compliance with prescribed source address ingress filtering rules.

Hence, the mobile node 12a is configured for outputting packets specifying the source address "ABCD::F0A0" 26a to the gateway 20a via the corresponding tunnel 24a, and outputting packets specifying the source address "BCDE::F032" 26b to the gateway 20b via the corresponding tunnel 24b.

Hence, the host 12a sends a binding update message, in accordance with RFC 3775 to the gateway 20a specifying that the "home address" (i.e., extra-site address) "ABCD::F0A0" 26a is reachable via its care-of address 16a; the host 12a also sends another a binding update message to the gateway 20b, specifying that the "home address" (i.e., extra-site address) "BCDE::F032" 26e is reachable via its care of address 16a.

Hence, the in-site network nodes 12a and 12b are configured to utilize their in-site addresses 16a and 16b as care-of address described in RFC 3775 while the in-site network nodes 12a and 12b are attached within the multihomed site 14. The in-site addresses 16a and 16b also can be provided to an internal Domain Name Service (DNS) 32a, enabling the DNS 32a to resolve host names "Host" and "CN1" to respective in-site addresses "FB0E::C01A" 16a and "FB0E::C101" 14b.

In addition, the in-site host 12a, having established the secure tunnels 24a and 24b, is able to select one of the tunnels 24a or 24b for traffic based on preference information having been established by either the host 12a, the gateways 20a or 20b, or any combination thereof. Hence, the host node 12a is able to select one of the extra-site addresses 26a or 26e, for example based on identified preferences, link metrics, network distance, load-balancing, etc.

In addition, the disclosed embodiment is compatible with the existing Mobile IPv6 protocol, enabling the host node 12a, when implemented as a mobile node, to continue communication with any node while the mobile node 12a is in the wide area network 22, for example by sending a binding update message to an external address "ABCD::0010" 26c used by the gateway 20a. The binding update message to the gateway 20a specifies that the mobile node 12a using the extra-site address "ABCD::F0A0" 26a address is reachable via the external care-of address "ABCD::C01A" 26d within the public address prefix "ABCD::/64" 28 owned by the gateway 20a. Hence, the gateway 20 is able to establish a secure tunnel with the mobile node 12a while the mobile node 12a is in the wide area network 22, encapsulating any packets destined for the extra-site address "ABCD::F0A0" 26a to the care-of address "ABCD::C01A" 26d.

Figure 2:
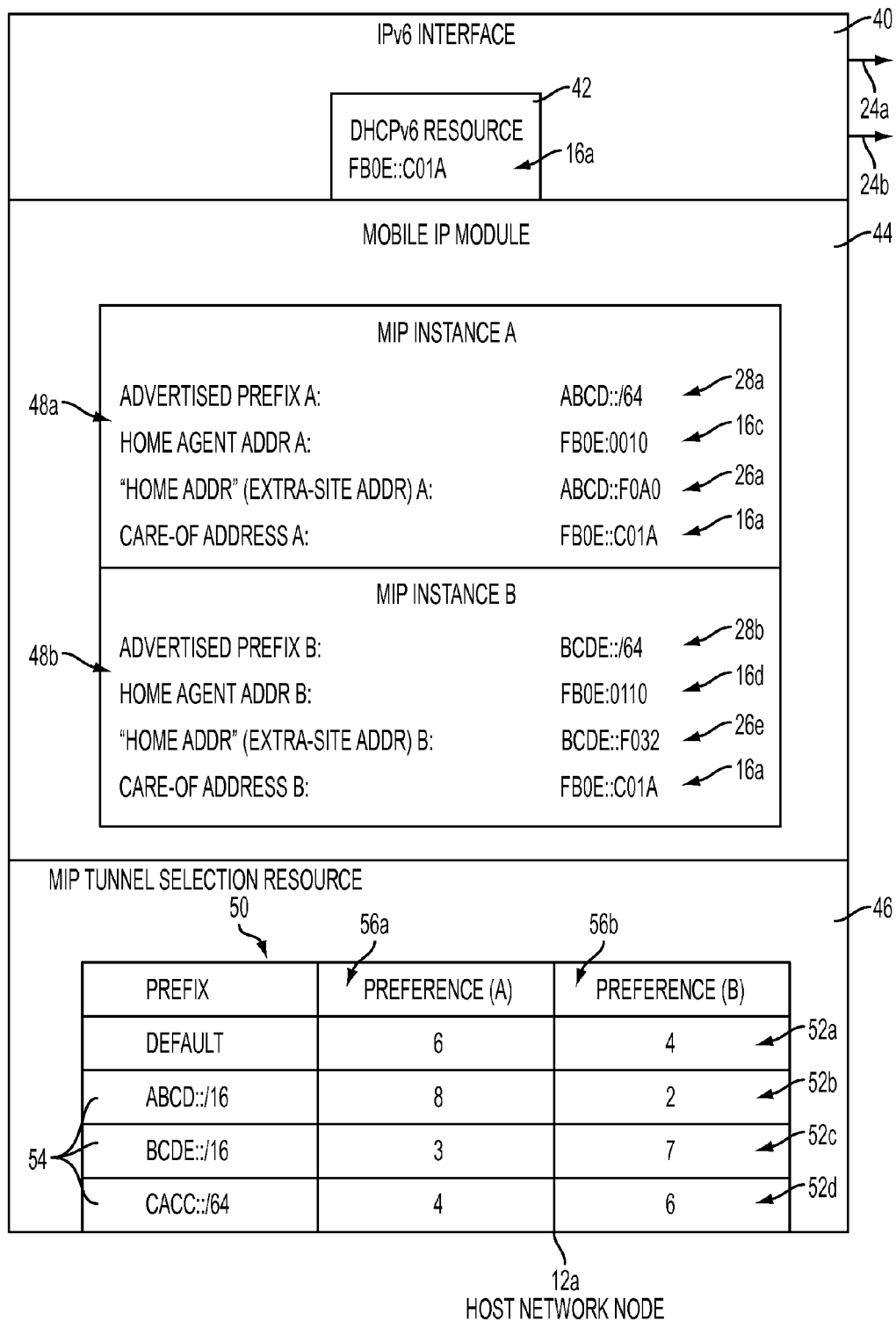
FIG. 2 is a diagram illustrating in detail the IPv6 host node of FIG. 1, according to an embodiment of the present invention.

FIG. 2 is a diagram illustrating the in-site network node 12a both FIG. 1, according to an embodiment of the present invention. The network node 12a includes an IPv6 interface 40, a dynamic host configuration protocol (DHCPv6) resource 42, a mobile IP module 44, and a mobile IP tunnel selection resource 46. The IPv6 interface 40 is configured for establishing the mobile IP tunnels 24a and 24b with the gateways 20a and 20b, respectively. The DHCPv6 resource 42 is configured for acquiring a unique in-site address 16a for communication within the multihomed site 14. As previously described, the in-site address 16a has an in-site address prefix 30 that is not reachable outside of the multihomed site 14. Hence, the host network node 12a needs to obtain an extra-site address for extra-site communications.

As described in further detail below with respect to FIG. 4, the mobile IP module 44 is configured for generating multiple instances 48a, 48b of mobile IP bindings in order to establish the respective tunnels 24a and 24b for use of extra-site source addresses 26a and 26e via the respective gateways 20a and 20b. Source address selection is managed by the mobile IP tunnel selection resource 46, which includes a preference table 50 having preference table entries 52 (e.g., 52a, 52b, 52c and 52d). In particular, the preference table entries 52b, 52c, and 52d each specify a corresponding public address prefix 54 and preference values 56a and 56b having been received from the respective gateways 20a and 20b; hence, the tunnel selection resource 46 is able to identify a preferred tunnel 24a or 24b based on identifying the higher preference 56a or 56b for a specified destination prefix 54. If a packet is destined for a destination that is not specified in the preference table 50, the selection resource chooses the preferred tunnel from the default entry 52a, illustrated as corresponding to the tunnel 24a terminated by the gateway 20a based on the higher preference value of "6". Additional details related to the host network node 12a can be obtained from the above-incorporated application Ser. No. 10/978,384.

Figure 3:
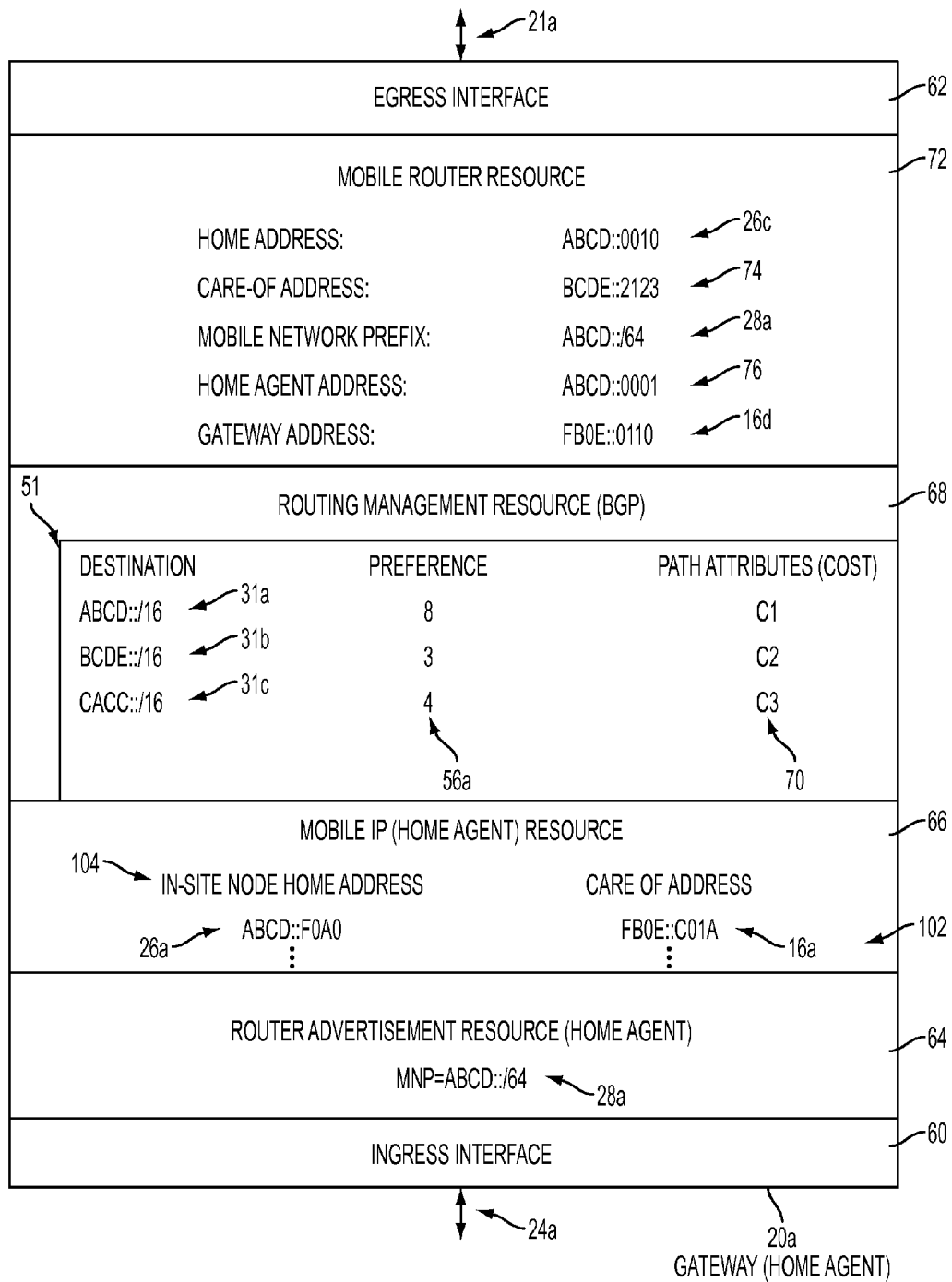
FIG. 3 is a diagram illustrating in detail one of the gateways of FIG. 1, according to an embodiment of the present invention.

FIG. 3 is a diagram illustrating the gateway 20a of FIG. 1, according to an embodiment of the present invention. The gateway 20a includes an ingress interface 60 for sending packets into the multihomed site 14 and receiving packets from the multihomed site 14, for example via a secure tunnel 24a having been established with the host network node 12a. The gateway 20a also includes an egress interface 62 configured for establishing an access path 21a with an access router (not shown) of the service provider 29a of FIG. 1 in order to establish reachability for communications by the host nodes 12 outside the multihomed site 14, for example communications with the correspondent node 18 via the wide area network 22.

The gateway 20a also includes a router advertisement resource 64, a home agent resource 66, a routing management resource 68 configured for receiving cost-based path attributes 70 according to a prescribed routing protocol, for example border gateway protocol (BGP) according to RFC 2545. The gateway 20a also preferably includes a mobile router resource 72, consistent with RFC 3775 and RFC 3963, that enables the gateway 20a to locate an alternate attachment router for accessing the wide area network 22 in the event that the link 21a with the access router encounters a failure. As described in further detail below with respect to FIG. 5, the gateway 20a is able to maintain connectivity with the wide area network 22 on behalf of its mobile network prefix 26c registering a care of address "BCDE::2123" 74 with a home agent 78 that serves the "mobile router" 20a. Additional details related to the gateway 20a can be obtained from the above-incorporated application Ser. No. 10/978,384.

Figure 4:
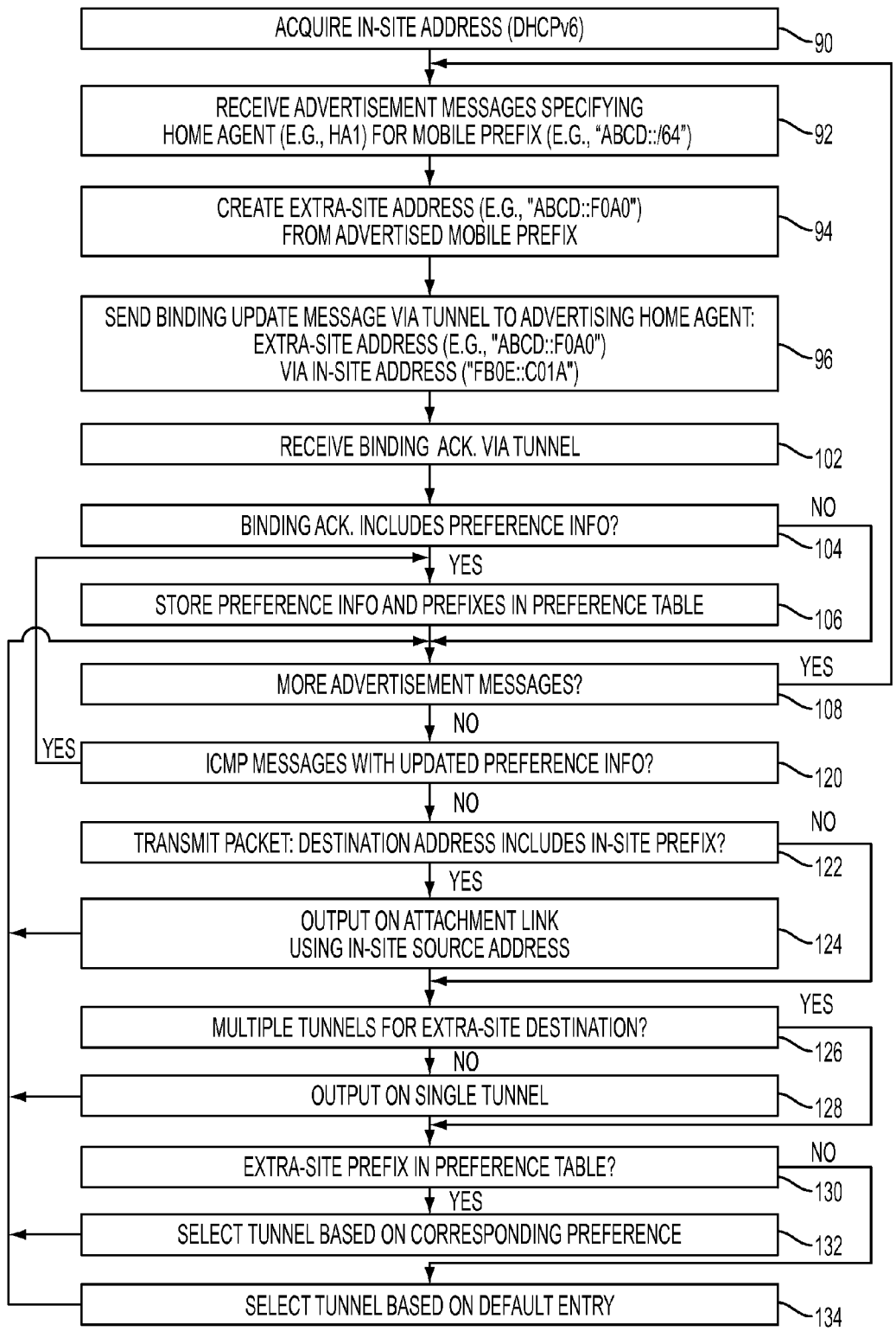
FIG. 4 is a diagram illustrating a method by the IPv6 host node of FIG. 2 of creating tunnels with the respective gateways of FIG. 1, and selecting a tunnel for packet transmission to an extra-site destination, according to an embodiment of the present invention.
Figure 5:
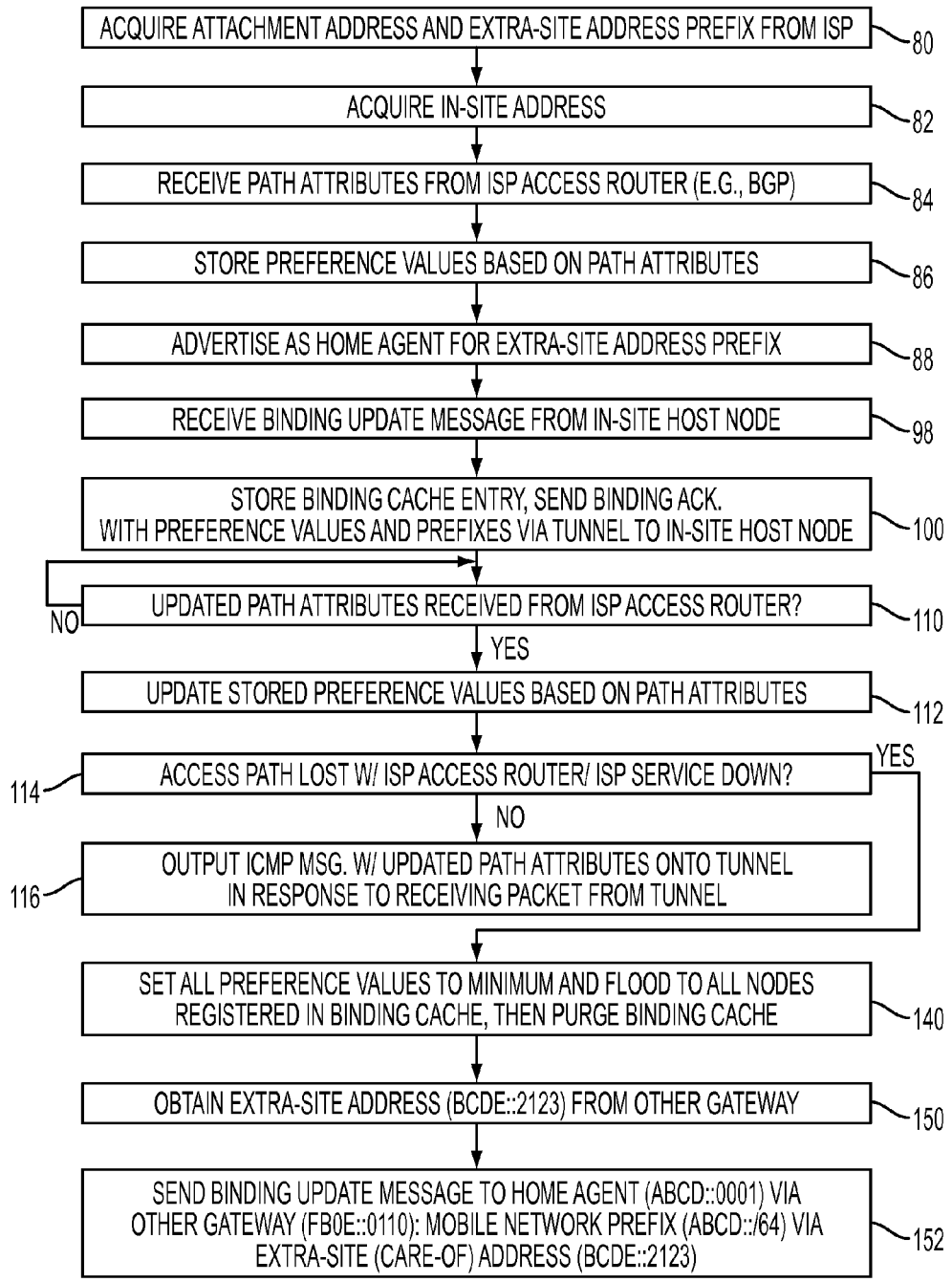
FIG. 5 is a diagram illustrating a method by the gateway of FIG. 3 of creating a tunnel with an in-site host for extra-site access by the in-site network node using an extra-site address, and supplying preference information for tunnel selection by the host, according to an embodiment of the present invention.

FIG. 4 is a diagram illustrating a method by the host node 12a of FIG. 2 of creating tunnels 24a and 24b with the respective gateways 20a and 20b of FIG. 1, and selecting a tunnel for packet transmission to an extra-site destination, according to an embodiment of the present invention. FIG. 5 is a diagram illustrating a method by the gateway 20a of FIG. 3 of creating a secure tunnel 24a with the in-site host 12a for extra-site access, and supplying preference information for tunnel selection by the host 12a, according to an embodiment of the present invention. The steps described herein with respect to FIGS. 4 and 5 can be implemented in the respective host network nodes 12 and the gateways 20 as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in the respective nodes 12a and 20a by initialization and attachment within the multihomed site 14, where the gateway 20a acquires in step 80 of FIG. 5 an attachment address and the extra-site address prefix 28a from the access router of the Internet service provider 29a; as apparent from the description herein, similar operations are performed in the other gateway 20b, including receiving the corresponding address prefix 28b. The gateway 20a also acquires in step 82 an in-site address 16c, for example due to manual provisioning, autoconfiguration or by automatic assignment from a DHCP server (not shown). Once the egress interface 62 of the gateway 20a has established the path 21a to the access router in the ISP 29a, the routing management resource 68 can begin to receive path attributes 70 in step 84 from the access router in the ISP 29a, for example according to BGP protocol. The routing management resource 68 stores the received path attributes 70, and stores associated preference values 56a in step 86, for example based on either internal computation or translation by the routing management resource 68. As described in further detail below, use of preference values 56a enables the selection resource 46 of the host network node 12a to identify a preferred tunnel 24a or 24b without the necessity of calculating path metrics according to existing routing protocols that are normally implemented by routers.

After having completed initialization in steps 80 through 86, the router advertisement resource 64 can begin advertising in step 88 into the multihomed site 14 by outputting advertisement messages via the ingress interface 60 specifying that in the gateway 20a is a home agent for the extra-site address prefix "ABCD::/64" 28a.

Referring to FIG. 4, the host network node 12a initializes by the DHCPv6 resource 42 acquiring in step 90 an in-site address 16a, for example from a DHCP server (not shown) in the multihomed site 14, or based on autoconfiguration. The IPv6 interface 40 receives in step 92 a router advertisement message, for example the router advertisement message output in step 88 of FIG. 5 from the gateway 20a, and passes the received router advertisement message to the mobile IP module 44. As described above, the mobile IP module 44 also may employ dynamic home agent address discovery (DHAAD) in order to solicit the router advertisement message, if needed. In response to the received router advertisement message, the mobile IP module 44 creates an instance 48a of a mobile IP resource configured for creating in step 94 the extra-site address "ABCD::F0A0" 26a from the advertised prefix 28a, and creating the tunnel 24a for sending in step 96 a binding update message to the home agent address "FB0E::0010" 16c specifying that the extra-site address "ABCD::F0A0" 26a is reachable via the care-of (in-site) address "FB0E::C01A" 16a. The mobile IP module 44 outputs the binding update message for delivery to the advertising gateway 20a via the corresponding secure tunnel 24a. Note that DHCPv6 also can be used to provide the extra-site address to the host network node 12a.

Referring to FIG. 5, the home agent resource 66 receives in step 98 the binding update message from the host network node 12a via the corresponding tunnel 24a, and in response stores in step 100 a binding cache entry 102 in the binding cache 104 specifying that the home address (extra-site address) "ABCD::F0A0" 26a is reachable via the care of address (in-site address) "FB0E::C01A" 16a. The home agent resource 66 also outputs in step 100 a binding acknowledgment to the host network node 12a via the corresponding tunnel 24a, and includes in the binding acknowledgment the preference values 56a and the respective prefixes 31a, 31b, and 31c specified in the preference table 51 managed by the routing management resource 68.

Referring to FIG. 4, the mobile IP module 44 responds to the binding acknowledgment received in step 102 via the secure tunnel 24a by checking in step 104 whether the binding acknowledgment message includes preference information. If the binding acknowledgment message includes preference information 56a, the preference information is passed to the tunnel selection resource which stores in step 106 the identified prefixes 54 and the respective preferences 56a in the preference table 50.

Once the binding with the gateway 20a has been completed and the preference information has been stored in the preference table 50, the mobile IP module 44 checks in step 108 whether any additional advertisement messages have been received or can be requested according to DHAAD protocol. Hence, the mobile IP module 44 will repeat the foregoing steps of FIG. 4 to create the second instance 48b of a mobile IP resource in order to obtain the second extra-site address "BCDE::F032" 26e and establish the second tunnel 24b with the second gateway 20b; further, the preference table 50 will be populated with the respective preferences 56b, enabling the selection resource 46 to select from the concurrently available source addresses 26a and 26b for extra-site communications via the respective tunnels 24a and 24b.

In particular, the routing management resource 68 of the gateway 20a is configured for determining in step 110 of FIG. 5 whether any updated path attributes 70 have been received from the ISP access router via the egress path 21a, for example due to traffic variations, updated routing metrics, or changes in traffic load. Any updated path attributes received in step 110 are stored by the routing management resource 68 into the preference table 51 in step 112, along with updated preference values 56a. If in step 114 the routing management resource 68 determines that the updated path attributes are relatively insubstantial and do not affect reachability via the ISP access router, the routing management resource 68 does not output in ICMP message with the updated path attributes until reception of a packet from the tunnel 24a in step 116; hence, the transmission of unnecessary update messages is minimized.

Hence, the tunnel selection resource 46 of the host network node 12a determines in step 120 whether any ICMP messages with updated preference information 56a or 56b has been received from either of the gateways 20a or 20b; if any ICMP messages have been received with updated preference information, the updated preference information 56a and/or 56b is stored in the preference table 50 by the selection resource 46 in step 106.

The tunnel selection resource 46 is configured for selecting a source address for a packet to be transmitted, based on the destination and associated preferences 56 related to the destination. In particular, if the tunnel selection resource 46 determines in step 122 that the destination address for a packet includes the in-site prefix "FB0E::/64" 30, the tunnel selection resource 46 passes the packet to the IPv6 interface 40 for transmission in step 124 via a an attachment link using the in-site source address 16a (alternately, the IPv6 interface 40 can perform the initial evaluation of the destination address in step 122, and pass the packet to the selection resource 46 in response to determining the destination address specifies an extra-site prefix).

In response to either the selection resource 46 or the IPv6 interface 40 determining in step 122 that the destination address does not include the in-site prefix 30, the tunnel selection resource 46 determines in step 126 whether multiple tunnels are available for selection from among multiple extra-site source addresses (e.g., 26a and 26e). If only one tunnel is available, the packet is output in step 128 on the single tunnel. If multiple tunnels are available, however, the tunnel selection resource 46 determines in step 130 whether the extra-site prefix is explicitly specified in the preference table 50 as one of the stored prefixes 54. If the extra-site prefix is explicitly specified in the preference table, for example the extra-site prefix "CACC::/64" for the destination address 36 of the correspondent node 18 of FIG. 1, the tunnel selection resource 46 selects the source address "BCDE::F032" 26e having the relatively higher preference value "6" 56b relative to the preference value "4" 56a, and outputs the packet onto the selected tunnel 24b in step 132 based on the corresponding preference. If, however, there is no matching address prefix 54 in the table 50, the selection resource 46 chooses the source address 26a and corresponding tunnel 24a based on the default entry 52a having the higher preference value 56a in step 134.

As apparent from the foregoing, the selection resource 46 chooses the extra-site source address 26a or 26e based on the relative preference values 56. Hence, the gateway 20a can dynamically reroute traffic in response to detecting a substantial failure in reaching the wide area network 22 via the egress link 21a.

Referring to FIG. 5, if in step 114 the routing management resource 68 determines that the access path 21a to the access router in the ISP 29a is lost, the routing management resource 68 is configured for setting in step 140 all of the stored preference values 56a to a minimum preference value (indicating to the selection resources 46 in the host network nodes 12 that use of the gateway 20a is to be avoided), and floods all the nodes registered in the binding cache 104 with ICMP messages with the minimum preference values via the respective tunnels 24. As apparent from the foregoing description with respect to the source address selection by the tunnel selection resource 46, the selection resource 46 will update its preference table 50 in response to receiving the ICMP messages in step 120, and avoid using the affected gateway 20a accordingly.

As described with respect to FIG. 3, the gateway 20a includes a mobile router resource 72 that enables the "mobile router" 20*a* to find an alternate attachment to the wide area network 22 in the event that the path 21*a* via the ISP 29*a* is no longer available. In particular, the mobile router resource 72 obtains in step 150 of FIG. 5 an extra-site address 74 from the advertised prefix 28b advertised by the gateway 20*b*, and sends in step 152 a binding update message to its home agent 78 via the alternate gateway 20*b* advertising the gateway address "FBOE:: 0110" within the site. The binding update message specifies that the mobile network prefix "ABCD::/ 64" 28*a* is reachable via the care of (extra-site) address "BCDE::2123" 74; the gateway 20*b*, in response to receiving the binding update message, strips off a private gateway address 16*d*, and forwards the binding update message (specifying only public address prefixes) to the ISP 29*b* for delivery to the home agent 78 via the wide area network 22. Hence, the home agent 78 can provide packets destined for the mobile network prefix "ABCD::/64" 28*a* for the public gateway address "ABCD::0010" 26*c* via the public care of address "BCDE::2123" 74 while the home link 21*a* is unavailable.

According to the disclosed embodiment, multiple gateways of a multihomed site provide secrecy of in-site addresses based on operating as home agents of a mobile IP protocol, while providing preference information to the in-site host nodes, enabling the in-site host nodes to establish multiple secure tunnels for source addresses selection from among multiple extra-site source addresses, and further enabling redirection of traffic based on updating the preference information relative to prescribed routing management protocols.

Also note the foregoing is not limited to Mobile IPv6 based implementation; rather, the foregoing also could be applied to IPv4 host nodes in accordance with RFC 3220.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an in-site network node having attached within a prescribed site, the method including:
    acquiring by the in-site network node, while the in-site network node is attached within the prescribed site, a unique in-site address reachable only by nodes within the prescribed site and having an in-site address prefix that is not reachable outside of the prescribed site, the prescribed site including first and second gateways each configured for providing the nodes within the prescribed site a corresponding access path outside the prescribed site;
    creating, by the in-site network node while the in-site network node is attached within the prescribed site, a first tunnel terminated within the prescribed site by the first gateway at a first end of the first tunnel and the in-site network node at a second end of the first tunnel, the first tunnel created by the in-site network node based on: (1) the in-site network node obtaining a first unique extra-site address having a first extra-site address prefix in response to receiving a first mobility protocol message specifying the first gateway is a home agent for the first extra-site address prefix, the first extra-site address prefix distinct from the in-site address prefix and reachable inside and outside the prescribed site, and (2) the in-site network node sending a first binding update message to the first gateway specifying that the first unique extra-site address is reachable via the unique in-site address;
    creating, by the in-site network node while the in-site network node is attached within the prescribed site, a second tunnel terminated within the prescribed site by the second gateway at a first end of the second tunnel and the in-site network node at a second end of the second tunnel, the second tunnel created by the in-site network node based on: (1) obtaining a second unique extra-site address having a second extra-site address prefix in response to receiving a second mobility protocol message specifying the second gateway is a home agent for the second extra-site address prefix, the second extra-site address prefix distinct from the in-site address prefix and the first extra-site address prefix and reachable inside and outside the prescribed site, and (2) sending a second binding update message to the second gateway specifying that the second unique extra-site address is reachable via one of the unique in-site address or a second unique in-site address having the in-site address prefix and having been acquired by the in-site network node, the first tunnel and the second tunnel concurrently available by the in-site network node; and
    outputting, by the in-site network node while the in-site network node is attached within the prescribed site, a packet via a selected one of the concurrently-available first tunnel or the second tunnel that is selected by the in-site network node, for delivery to an extra-site destination address via the corresponding one of the first gateway or the second gateway, based on an identified preference between the first gateway and the second gateway.

2. The method of claim 1, wherein the identified preference is based on first preference information received from the first gateway, the method further comprising receiving a first binding acknowledgment message from the first gateway relative to the first binding update message, the first binding acknowledgment message including the first preference information.

3. The method of claim 2, wherein the first preference information identifies first public address prefixes and respective preference values identifying respective preferences for reaching the respective first public address prefixes by the first gateway.

4. The method of claim 3, wherein the identified preference is further based on second preference information received from the second gateway, the method further comprising receiving a second binding acknowledgment message from the second gateway relative to the second binding update message, the second binding acknowledgment message including the second preference information.

5. The method of claim 4, wherein the second preference information identifies second public address prefixes and respective preference values identifying respective preferences for reaching the respective second public address prefixes by the first gateway.

6. The method of claim 5, further comprising:
    if the extra-site destination address is within one of the first or second public address prefixes, identifying the identified preference based on identifying from the first and second preference information a higher preference value relative to the extra-site destination address;
    if the extra-site destination address is not within one of the first or second public address prefixes and not identifiable, identifying the identified preference from a default route having been determined based on the first and second preference information.

7. The method of claim 2, wherein the identified preference is further based on second preference information received from the second gateway, the method further comprising receiving a second binding acknowledgment message from the second gateway relative to the second binding update message, the second binding acknowledgment message including the second preference information.

8. The method of claim 7, further comprising identifying the identified preference based on the first and second preference information.

9. The method of claim 7, further comprising:
storing the first and second preference information in a memory in the in-site network node;
receiving an updated message from the first gateway specifying updated first preference information; and
updating the first preference stored in the memory with the updated first preference information for subsequent selection of identified preferences for respective subsequent packets.

10. The method of claim 1, further comprising identifying the identified preference for the second gateway based on a determined condition of the first gateway relative to the second gateway.

11. A method in a gateway configured for providing access to in-site network nodes within a prescribed multihomed site to at least a first extra-site destination, the method comprising:
outputting by the gateway an advertisement message into the prescribed multihomed site, the advertisement message specifying the gateway in the prescribed multihomed site is a home agent for a specified first extra-site address prefix that is distinct from a prescribed in-site address prefix, the first extra-site address prefix reachable inside and outside the prescribed multihomed site and the prescribed in-site address prefix reachable only within the prescribed multihomed site;
storing by the gateway preference information identifying a preference of the gateway for reaching at least the first extra-site destination via a first access path exiting the prescribed multihomed site from the first gateway;
receiving by the gateway a binding update message from a first of the in-site network nodes specifying a unique extra-site address, used by the first in-site network node and having the first extra-site address prefix, is reachable via a unique in-site address used by the first in-site network node and having the prescribed in-site address prefix;
creating by the gateway a first tunnel terminated within the prescribed multihomed site by the first in-site network node at a first end of the first tunnel and the gateway at a second end of the first tunnel in response to the binding update message, the first tunnel enabling the first in-site network node to send and receive packets via the first access path using the unique extra-site address; and
sending by the gateway to the first in-site network node the preference information for reaching at least the first extra-site destination, enabling the first in-site network node to select between the gateway and a second gateway configured for providing access for the in-site network nodes to at least one of the first extra-site destination or a second extra-site destination via a second access path exiting the prescribed multihomed site from the second gateway.

12. The method of claim 11, further comprising determining the preference information based on path attributes received from a service provider via the first access path according to a prescribed routing protocol.

13. The method of claim 12, further comprising updating the preference information to updated preference information based on updated path attributes received from the service provider according to the prescribed routing protocol.

14. The method of claim 13, further comprising:
creating a binding cache entry in a binding cache in response to the binding update message;
if the updated path attributes identify an unavailability of reaching the service provider via the first access path, setting the preference information to a minimized preference and outputting a management message specifying the minimized preference to each in-site node identified in the binding cache; and
if the updated path attributes do not identify an unavailability of reaching the service provider via the first access path, outputting the updated preference information to the first in-site network node in response to receiving a packet from the first in-site network node via the first tunnel.

15. The method of claim 14, further comprising creating a second tunnel, as a mobile router, with the second gateway in response to the updated path attributes identifying an unavailability of reaching the service provider via the first access path, the creating including:
(1) obtaining a second extra-site address having a second extra-site address prefix in response to receiving a second advertisement message specifying the second gateway is a home agent for the second extra-site address prefix, the second extra-site address prefix distinct from the first extra-site address prefix and the in-site address prefix and reachable inside and outside the prescribed multihomed site; and
(2) sending a second binding update message to the second gateway specifying that the first extra-site address prefix is reachable via the second extra-site address.

16. The method of claim 14, further comprising purging the binding cache, after having output the management message, in response to the updated path attributes identifying an unavailability of reaching the service provider via the first access path.

17. The method of claim 12, further comprising creating a second tunnel, as a mobile router, with the second gateway in response to the path attributes identifying an unavailability of reaching the service provider via the first access path, the creating including:
(1) obtaining a second extra-site address having a second extra-site address prefix in response to receiving a second advertisement message specifying the second gateway is a home agent for the second extra-site address prefix, the second extra-site address prefix distinct from the first extra-site address prefix and the in-site address prefix and reachable inside and outside the prescribed multihomed site; and
(2) sending a second binding update message to the second gateway specifying that the first extra-site address prefix is reachable via the second extra-site address.

18. An in-site network node configured for attaching within a prescribed site, the node including:
a first address resource configured for acquiring a unique in-site address reachable only by nodes within the prescribed site and having an in-site address prefix that is not reachable outside of the prescribed site, the prescribed site including first and second gateways each configured for providing the nodes within the prescribed site a corresponding access path outside the prescribed site;
a mobile IP module configured for creating a first tunnel terminated within the prescribed site by the first gateway at a first end of the first tunnel and the in-site network node at a second end of the first tunnel, while the in-site network node is attached within the prescribed site, the first tunnel created by the mobile IP module based on: (1) the in-site network node obtaining a first unique extra-site address having a first extra-site address prefix in response to receiving a first mobility protocol message specifying the first gateway is a home agent for the first extra-site address prefix, the first extra-site address prefix distinct from the in-site address prefix and reachable inside and outside the prescribed site, and (2) the in-site network node sending a first binding update message to the first gateway specifying that the first unique extra-site address is reachable via the unique in-site address;

the mobile IP module further configured for creating a second tunnel terminated within the prescribed site by the second gateway at a first end of the second tunnel and the in-site network node at a second end of the second tunnel, while the in-site network node is attached within the prescribed site, the second tunnel created by the mobile IP module based on: (1) obtaining a second unique extra-site address having a second extra-site address prefix in response to receiving a second mobility protocol message specifying the second gateway is a home agent for the second extra-site address prefix, the second extra-site address prefix distinct from the in-site address prefix and the first extra-site address prefix and reachable inside and outside the prescribed site, and (2) sending a second binding update message to the second gateway specifying that the second unique extra-site address is reachable via one of the unique in-site address or a second unique in-site address having the in-site address prefix and having been acquired by the in-site network node, the first tunnel and the second tunnel concurrently available by the in-site network node; and a selection resource configured for outputting a packet, while the in-site network node is attached within the prescribed site, via a selected one of the concurrently-available first tunnel or the second tunnel that is selected by the selection resource, for delivery to an extra-site destination address via the corresponding one of the first gateway or the second gateway, based on an identified preference between the first gateway and the second gateway.

19. The node of claim 18, wherein the identified preference is based on first preference information, the mobile IP module configured for receiving a first binding acknowledgment message from the first gateway relative to the first binding update message, the first binding acknowledgment message specifying the first preference information.

20. The node of claim 19, wherein the first preference information identifies first public address prefixes and respective preference values identifying respective preferences for reaching the respective first public address prefixes by the first gateway.

21. The node of claim 20, wherein the identified preference is further based on second preference information, the mobile IP module configured for receiving a second binding acknowledgment message from the second gateway relative to the second binding update message, the second binding acknowledgment message specifying the second preference information.

22. The node of claim 21, wherein the second preference information identifies second public address prefixes and respective preference values identifying respective preferences for reaching the respective second public address prefixes by the first gateway.

23. The node of claim 22, wherein the selection resource is configured for identifying if the extra-site destination address is within one of the first or second public address prefixes, wherein:

the selection resource is configured to, if the extra-site destination address is within one of the first or second public address prefixes, identify the identified preference based on identifying from the first and second preference information a higher preference value relative to the extra-site destination address;

the selection resource is configured to, if the extra-site destination address is not within one of the first or second public address prefixes and not identifiable, identify the identified preference from a default route having been selected based on the first and second preference information.

24. The node of claim 19, wherein the identified preference is further based on second preference information, the mobile IP module configured for receiving a second binding acknowledgment message from the second gateway relative to the second binding update message, the second binding acknowledgment message including the second preference information.

25. The node of claim 24, wherein the selection resource is configured for identifying the identified preference based on the first and second preference information.

26. The node of claim 24, further comprising a memory configured for storing the first and second preference information, the selection resource configured for updating the first preference stored in the memory with updated first preference information, received from an updated message from the first gateway, for subsequent selection of identified preferences for respective subsequent packets.

27. The node of claim 18, wherein the selection resource is configured for identifying the identified preference for the second gateway based on a determined condition of the first gateway relative to the second gateway.

28. A gateway configured for providing access to in-site network nodes within a prescribed multihomed site to at least a first extra-site destination, the gateway comprising:

an ingress interface configured for communication into the prescribed multihomed site;

an egress interface configured for establishing a first access path for communication outside the prescribed multihomed site;

an advertisement resource configured for outputting an advertisement message via the ingress interface into the prescribed multihomed site, the advertisement message specifying the gateway in the prescribed multihomed site is a home agent for a specified first extra-site address prefix that is distinct from a prescribed in-site address prefix, the first extra-site address prefix reachable inside and outside the prescribed multihomed site and the prescribed in-site address prefix reachable only within the prescribed multihomed site;

a routing management resource configured for storing preference information identifying a preference of the gateway for reaching at least the first extra-site destination via the first access path;

a mobile IP resource configured for receiving a binding update message from a first of the in-site network nodes specifying a unique extra-site address, used by the first in-site network node and having the first extra-site address prefix, is reachable via a unique in-site address used by the first in-site network node and having the prescribed in-site address prefix;

the mobile IP resource configured for creating a first tunnel terminated within the prescribed multihomed site by the first in-site network node at a first end of the first tunnel and the gateway at a second end of the first tunnel in response to the binding update message, the first tunnel enabling the first in-site network node to send and receive packets via the first access path using the unique extra-site address;

the routing management resource configured for sending to the first in-site network node the preference information for reaching at least the first extra-site destination, enabling the first in-site network node to select between the gateway and a second gateway configured for providing access for the in-site network nodes to at least one of the first extra-site destination or a second extra-site destination via a second access path exiting the prescribed multihomed site from the second gateway.

29. The gateway of claim 28, wherein the routing management resource is configured for determining the preference information based on path attributes received from a service provider via the first access path according to a prescribed routing protocol.

30. The gateway of claim 29, wherein the routing management resource is configured for updating the preference information to updated preference information based on updated path attributes received from the service provider according to the prescribed routing protocol.

31. The gateway of claim 30, further comprising a binding cache configured for storing binding cache entries, wherein:
the mobile IP resource is configured for adding a binding cache entry in the binding cache in response to the binding update message;
the routing management resource, in response to determining the updated path attributes identify an unavailability of reaching the service provider via the first access path, is configured for setting the preference information to a minimized preference and outputting a management message specifying the minimized preference to each in-site node identified in the binding cache;
the routing management resource, in response to determining the updated path attributes do not identify an unavailability of reaching the service provider via the first access path, is configured for outputting the updated preference information to the first in-site network node in response to the mobile IP resource receiving a packet from the first in-site network node via the first tunnel.

32. The gateway of claim 31, wherein the mobile IP resource is configured for creating a second tunnel, as a mobile router, with the second gateway in response to the routing management resource determining the updated path attributes identify an unavailability of reaching the service provider via the first access path, the mobile IP resource configured for creating the second tunnel based on:
(1) obtaining a second extra-site address having a second extra-site address prefix in response to receiving a second advertisement message specifying the second gateway is a home agent for the second extra-site address prefix, the second extra-site address prefix distinct from the first extra-site address prefix and the in-site address prefix and reachable inside and outside the prescribed multihomed site; and
(2) sending a second binding update message to the second gateway specifying that the first extra-site address prefix is reachable via the second extra-site address.

33. The gateway of claim 31, wherein the routing management resource is configured for causing a purging of the binding cache, after having output the management message, in response to the updated path attributes identifying an unavailability of reaching the service provider via the first access path.

34. The gateway of claim 29, wherein the mobile IP resource is configured for creating a second tunnel, as a mobile router, with the second gateway in response to the routing management resource determining the path attributes identifying an unavailability of reaching the service provider via the first access path, the mobile IP resource configured for creating the second tunnel based on:
(1) obtaining a second extra-site address having a second extra-site address prefix in response to receiving a second advertisement message specifying the second gateway is a home agent for the second extra-site address prefix, the second extra-site address prefix distinct from the first extra-site address prefix and the in-site address prefix and reachable inside and outside the prescribed multihomed site; and
(2) sending a second binding update message to the second gateway specifying that the first extra-site address prefix is reachable via the second extra-site address.

35. An in-site network node configured for attaching within a prescribed site, the node including:
means for acquiring a unique in-site address while the in-site network node is attached within the prescribed site, the unique in-site address being reachable only by nodes within the prescribed site and having an in-site address prefix that is not reachable outside of the prescribed site, the prescribed site including first and second gateways each configured for providing the nodes within the prescribed site a corresponding access path outside the prescribed site;
means for creating a first tunnel terminated within the prescribed site by the first gateway at a first end of the first tunnel and the in-site network node at a second end of the first tunnel while the in-site network node is attached within the prescribed site, the first tunnel created by the means for creating based on: (1) the in-site network node obtaining a first unique extra-site address having a first extra-site address prefix in response to receiving a first mobility protocol message specifying the first gateway is a home agent for the first extra-site address prefix, the first extra-site address prefix distinct from the in-site address prefix and reachable inside and outside the prescribed site, and (2) the in-site network node sending a first binding update message to the first gateway specifying that the first unique extra-site address is reachable via the unique in-site address;
the means for creating the first tunnel further configured for creating a second tunnel terminated within the prescribed site by the second gateway at a first end of the second tunnel and the in-site network node at a second end of the second tunnel, while the in-site network node is attached within the prescribed site, the second tunnel created by the means for creating based on: (1) obtaining a second unique extra-site address having a second extra-site address prefix in response to receiving a second mobility protocol message specifying the second gateway is a home agent for the second extra-site address prefix, the second extra-site address prefix distinct from the in-site address prefix and the first extra-site address prefix and reachable inside and outside the prescribed site, and (2) sending a second binding update message to the second gateway specifying that the second unique extra-site address is reachable via one of the unique in-site address or a second unique in-site address having the in-site address prefix and having been acquired by the in-site network node, the first tunnel and the second tunnel concurrently available by the in-site network node; and selection means for outputting a packet, while the in-site network node is attached within the prescribed site, via a selected one of the concurrently-available first tunnel or the second tunnel that is selected by the selection means, for delivery to an extra-site destination address via the corresponding one of the first gateway or the second gateway, based on an identified preference between the first gateway and the second gateway.

36. A gateway configured for providing access to in-site network nodes within a prescribed multihomed site to at least a first extra-site destination, the gateway comprising:

first interface means for communication into the prescribed multihomed site;

second interface means for establishing a first access path for communication outside the prescribed multihomed site;

means for outputting an advertisement message via the ingress interface into the prescribed multihomed site, the advertisement message specifying the gateway in the prescribed multihomed site is a home agent for a specified first extra-site address prefix that is distinct from a prescribed in-site address prefix, the first extra-site address prefix reachable inside and outside the prescribed multihomed site and the prescribed in-site address prefix reachable only within the prescribed multihomed site;

means for storing preference information identifying a preference of the gateway for reaching at least the first extra-site destination via the first access path;

means for receiving a binding update message from a first of the in-site network nodes specifying a unique extra-site address, used by the first in-site network node and having the first extra-site address prefix, is reachable via a unique in-site address used by the first in-site network node and having the prescribed in-site address prefix;

the means for receiving the binding update message further configured for creating a first tunnel terminated within the prescribed multihomed site by the first in-site network node at a first end of the first tunnel and the gateway at a second end of the first tunnel in response to the binding update message, the first tunnel enabling the first in-site network node to send and receive packets via the first access path using the unique extra-site address;

the means for storing preference information further configured for sending to the first in-site network node the preference information for reaching at least the first extra-site destination, enabling the first in-site network node to select between the gateway and a second gateway configured for providing access for the in-site network nodes to at least one of the first extra-site destination or a second extra-site destination via a second access path exiting the prescribed multihomed site from the second gateway.

37. A multihomed site comprising:

in-site network nodes, each configured for attaching within the multihomed site; and first and second gateways configured for providing access outside of the multihomed site, each gateway comprising:

(1) an ingress interface configured for communication into the multihomed site;

(2) an egress interface configured for establishing a corresponding access path for communication outside the multihomed site;

(3) an advertisement resource configured for outputting a corresponding advertisement message into the multihomed site and that specifies the corresponding gateway is a home agent for a corresponding extra-site address prefix that is distinct from a prescribed in-site address prefix, the corresponding extra-site address prefix reachable inside and outside the multihomed site and the prescribed in-site address prefix reachable only within the multihomed site;

(4) a routing management resource configured for storing preference information identifying a corresponding preference of the corresponding gateway for reaching accessing an extra-site destination via the corresponding access path;

(5) a mobile IP resource configured for receiving a binding update message from a first of the in-site network nodes, and in response creating a corresponding tunnel terminated within the multihomed site by the first in-site network node at a first end of the tunnel and the corresponding gateway at a second end of the tunnel, the corresponding tunnel enabling the first in-site network node to send and receive packets via the corresponding access path;

wherein each in-site network node includes:

(1) a first address resource configured for acquiring a corresponding in-site address, having the in-site address prefix, for communication within the multihomed site;

(2) a mobile IP module configured for outputting first and second binding update messages to the first and second gateways, respectively, the first and second binding update messages specifying that respective first and second extra-site addresses within the respective extra-site prefixes are reachable via the corresponding in-site address, the mobile IP module establishing first and second tunnels with the first and second gateways based on the first and second binding update messages, respectively, the first tunnel terminated within the multihomed site by the first gateway at the corresponding first end and the corresponding in-site network node at the corresponding second end and the second tunnel terminated within the multihomed site by the second gateway at the corresponding first end and the corresponding in-site network node at the corresponding second end; and (3) a selection resource configured for outputting a packet, for delivery to an extra-site destination address external to the multihomed network, via a selected one of the concurrently-available first tunnel or the second tunnel that is selected by the selection resource, based on the preference information received from the first gateway and the second gateway, the first tunnel and the second tunnel concurrently available by the corresponding in-site network node.

* * * * *